(12) United States Patent
Lin et al.

(10) Patent No.: US 7,025,489 B2
(45) Date of Patent: Apr. 11, 2006

(54) ASSEMBLING FRAME FOR BACK LIGHT MODULES

(75) Inventors: Ching-Huang Lin, Penghu (TW); Jan-Chang Jan, Changhua (TW)

(73) Assignee: Toppoly Optoelectronics Corp., (TW)

( * ) Notice: Subject to any disclaimer, the term of this patent is extended or adjusted under 35 U.S.C. 154(b) by 42 days.

(21) Appl. No.: 10/823,602

(22) Filed: Apr. 14, 2004

(65) Prior Publication Data

US 2004/0257816 A1 Dec. 23, 2004

(30) Foreign Application Priority Data

Apr. 25, 2003 (TW) ............................... 92206613 U

(51) Int. Cl.
*F21V 7/04* (2006.01)

(52) U.S. Cl. ........................ 362/633; 362/362; 362/634

(58) Field of Classification Search ................ 362/362, 362/367–368, 632–634; 349/58, 60, 65, 349/70

See application file for complete search history.

(56) References Cited

U.S. PATENT DOCUMENTS

| | | | |
|---|---|---|---|
| 6,201,586 B1 * | 3/2001 | Nakayama | 349/58 |
| 6,339,418 B1 * | 1/2002 | Kitagawa | 345/102 |
| 6,490,016 B1 * | 12/2002 | Koura | 349/58 |
| 6,533,428 B1 * | 3/2003 | Ogo et al. | 362/631 |
| 6,820,992 B1 * | 11/2004 | Yu et al. | 362/633 |
| 6,839,100 B1 * | 1/2005 | Saito et al. | 349/58 |
| 2002/0041482 A1 * | 4/2002 | Sun et al. | 361/681 |

* cited by examiner

*Primary Examiner*—Ali Alavi
(74) *Attorney, Agent, or Firm*—Harness, Dickey & Pierce, P.L.C.

(57) ABSTRACT

A assembling frame for back light modules for securely assembling and anchoring the elements of a back light module and providing a selected deformation to overcome the impact on the back light module resulting from usage and environmental conditions, and including a flexible latch blade on a assembling frame to hold a lateral side of the light guide panel and accommodate the deformation occurring to the light guide panel after having absorbed water and expanding or warping. The anchoring relationship may be maintained even when the light guide panel is in usage or various environmental conditions such as high temperature and high humidity.

8 Claims, 6 Drawing Sheets

ASSEMBLING FRAME FOR BACK LIGHT MODULES

FIELD OF THE INVENTION

The invention relates to a assembling frame for assembling laminated elements that consist of multiple layers such as back light modules that consist of a reflector, a light guide panel and optical films.

BACKGROUND OF THE INVENTION

A Liquid Crystal Display (LCD) generally consists of a Liquid Crystal Module (LCM) and a Back Light Module. As liquid crystals do not generate light by themselves, the back light module provides the light source required by the LCM to accomplish display functions. The back light module in the LCD generally consists of a Cold Cathode Fluorescent Lamp (CCFL), a metal lampshade, a reflector, a light guide panel (LGP), a plurality of optical films (such as diffusers), a plastics frame and a metal frame. The LGP usually is made from Polymethylmethacrylate (PMMA) by injection forming to form a square plate with smooth surfaces. The square plate has a thicker side and a thinner other side with the thickness therebetween tapering gradually. The bottom side of the LGP is printed with material which has high reflection and no light absorption properties by silk-screening to form diffusion spots. The thicker side of the LGP is corresponded to a light source. Light emitted from the light source transmits to the thinner side by reflection. When the light projects on the diffusion spots, reflected light diffuses in all angles. The condition of reflection is broken. Light emits from the front side of the LGP. By forming the diffusion spots in dots of different densities and sizes, the LGP may illuminate evenly. As the function of the LGP is to scatter light in different directions to increase luminosity and achieve uniform brightness of the LCM, the quality of the LGP has a great impact on the back light module. With improved manufacturing processes and material, the yield of the LGP has reached a desired level. Coupled with suitable assembly, the back light module can provide a uniform light source for the LCM.

On the back light module, the metal lampshade is located on one side of the plastics frame. The light source is housed in the metal lampshade. The reflector, LGP and optical films are slightly smaller than the plastics frame. The reflector is firstly mounted on the bottom of the plastics frame. Then the thicker side of the LGP is wedged in the metal lampshade. The optical films are stacked on the LGP in a laminated fashion. The plastics frame prevents the LGP from moving in the directions of the X-axis and Y-axis. In addition, the plastic frame has latch blades extended inwards corresponding to the corners of the metal lampshade to latch the edges of the LGP to prohibit the LGP from moving in the direction of the Z-axis. Thereby the LGP is confined in the plastics frame. Finally, the metal frame encases the plastics frame from the outside to complete the back light module.

The assembling structure of the back light module set forth above has some critical problems: first, the distance between the thicker side of the LGP and the light source is critical. The LGP must maintain a definite distance with the light source to allow light emitted by the light source to enter the LGP; second, the thicker side of the LGP must be coupled with the metal lampshade properly. That is the thicker side of the LGP must be completely wedged into the metal lampshade to prevent the light emitted from the light source from scattering out through the juncture. The aforesaid concerns basically can be resolved by precisely controlling the dimensional relationships such as the dimensional relationship of the LGP and the plastics frame, metal lampshade and wedging position of the LGP, and the coupling relationship between the latch blades and the LGP. However, the actual situation does not always happen as desired. For instance, material properties of the LGP, use conditions of the LCD or environmental conditions might change the dimensional relationships. In order to prevent damage from occurring to the back light module due to use conditions or environmental conditions, vendors of back light modules usually have to perform reliability tests in various use and environmental conditions such as high temperature, high humidity, or the like to ensure that the back light module can overcome the factors being encountered. The LGP made from PMMA, for example, will absorb water and expand and deform. The expansion rate of PMMA is about 0.3%. To resolve the expansion problem of the LGP after absorbing water, a gap is generally created between the LGP and the plastics frame to give the LGP a desired expansion space in the high humidity environment and prevent the LGP from warping after absorbing water and expanding. The gap design creates other problems. For instance, if the gap is too large, the plastics frame can better accommodate the environmental conditions but is less capable to accommodate the use conditions. On the other hand, if the gap is too small, the plastics frame can better accommodate the use conditions but is less capable to accommodate the environmental conditions. For instance, when the LCD is used on notebook computers, which are often carried outdoors and for which the display device must be lifted for use and closed when not in use, the gap should be as small as possible to avoid the thicker side of the LGP of the back light module from separating from the metal lampshade. However, if the gap is smaller, when the notebook computers are used in areas of high humidity, the deformation caused by expansion of the LGP is smaller, and the LGP tends to warp. This severely impacts the display effect.

SUMMARY OF THE INVENTION

The invention is to provide a assembling frame to prevent the LGP from breaking away from the metal lampshade to ensure that the light source can completely project light to the LGP and deformation occurring to the LGP in high humidity environments can be absorbed without incurring warping.

The assembling frame for back light modules according to the invention is substantially a rectangular frame with frame edges of a selected height on four sides. On one side of the frame edges, there are a plurality of latch blades which are flexible and extended horizontally. A plurality of flaps are formed on two top sides of the frame edges abutting the latch blades. The flexible latch blades are for shrinking the gap between the assembling frame and the LGP to achieve secured anchoring for the LGP. Moreover, when the LGP deforms due to environmental factors, the flexible latch blades can absorb the deformation of the LGP. The flaps further depress the top side of the LGP to confine two sides so that the LGP does not warp.

The assembling frame for back light modules according to the invention aims at resolving the dimensional matching problem between the LGP and assembling frame and maintaining an anchored relationship therebweteen, and also enabling the assembling frame to absorb a selected amount of deformation of the LGP, and in the mean time accommodating use and environmental conditions, thereby greatly increasing the yield of reliability tests in various usage and environmental conditions. The back light module thus made may be used on the LCD of notebook computers, and withstand more varied usage and environmental conditions, and can effectively improve product quality.

The foregoing, as well as additional objects, features and advantages of the invention will be more readily apparent from the following detailed description, which proceeds with reference to the accompanying drawings. The drawings are only to serve for reference and illustrative purposes, and are not intended to limit the scope of the invention.

DESCRIPTION OF THE PREFERRED EMBODIMENTS

Figure 1:
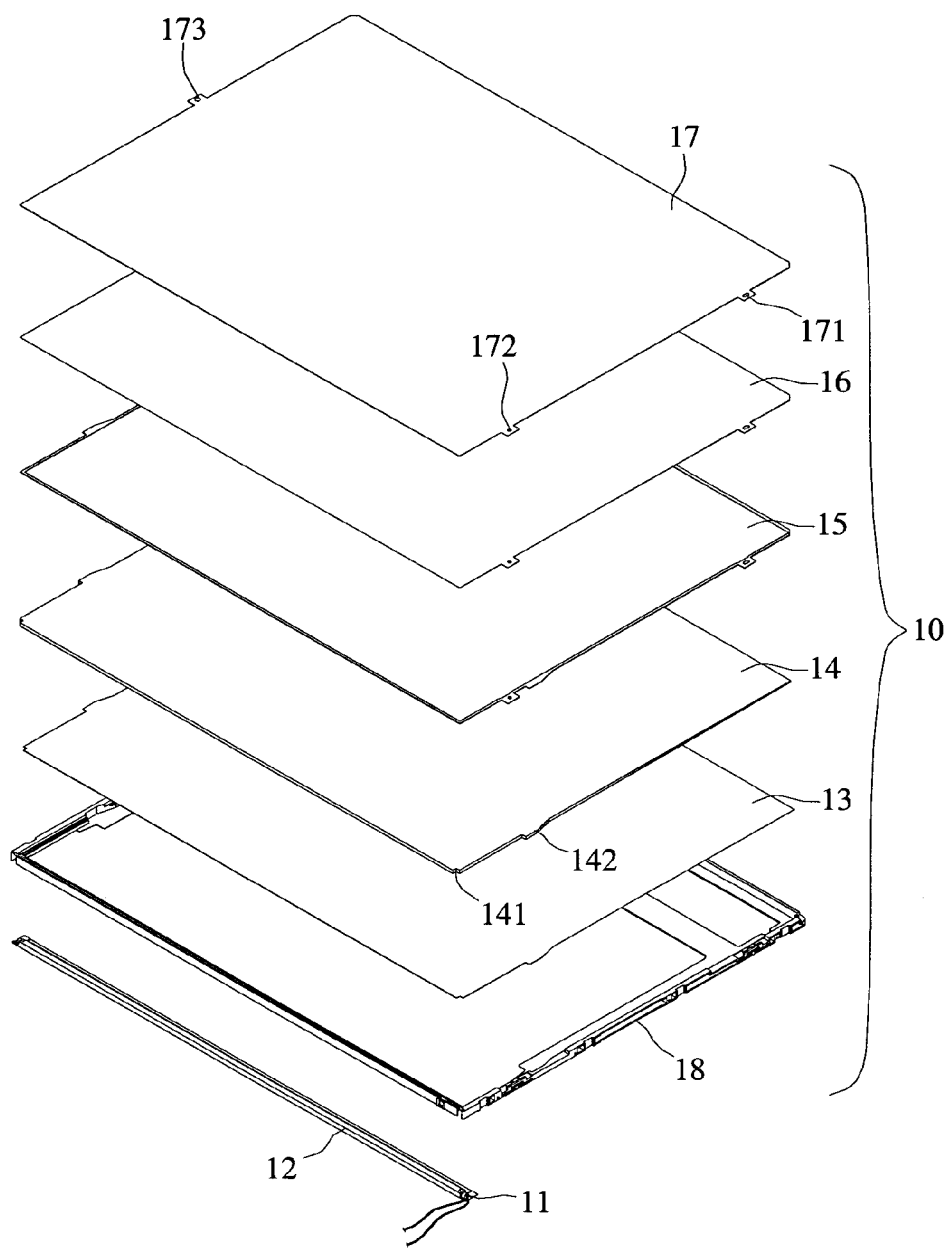
FIG. 1 is an exploded view of the structure of a back light module.

The assembling frame of the invention is adopted for use on a back light module for assembling a laminated structure which consists of multiple layers such as a reflector, a light guide panel and optical films. As shown in FIG. 1, the back light module 10 includes a light source 11, a metal lampshade 12, a reflector 13, a light guide panel 14, a plurality of optical films 15, 16 and 17, a assembling frame 18 and a metal frame (not shown in the drawing). The assembling frame 18 is a rectangular frame made from plastics by integrated injection forming (details will be discussed later). The metal lampshade 12 is located on one side of the assembling frame 18. The light source 11 is located inside the metal lampshade 12. The dimensions of the reflector 13, light guide panel 14 and optical films 15, 16 and 17 are slightly smaller than the assembling frame 18. The reflector 13 is located on the bottom of the assembling frame 18, and the light guide panel 14 is mounted onto the reflector 13 with one side inserted into the metal lampshade 12. The optical films 15, 16 and 17 are stacked onto the light guide panel 14 in this order. Finally, the metal frame encases the assembling frame 18 from the outside to form the back light module 10. The light guide panel 14 is made from Polymethylmethacrylate (PMMA) in a wedge plate. It has one thicker side to receive light emitting from the light source 11 and evenly distribute the light on the light guide panel 14 to provide a uniform light source for the liquid crystal module (not shown in the drawing) to achieve the desired display effect. Therefore the light guide panel 14 and the assembling frame 18 must have a good matching relationship to enable the light guide panel 14 to correctly receive light emitted from the light source 11. Moreover, the light guide panel 14 made from PMMA has about 0.3% expansion and deformation after having absorbed water, thus in addition to providing a matching assembly relationship between the light guide panel 14 and the assembling frame 18, the assembling frame 18 must be able to absorb the deformation of the light guide panel 14 caused by environmental factors to ensure that normal display quality can be maintained in various usage and environmental conditions such as high temperature and humidity.

Figure 2:
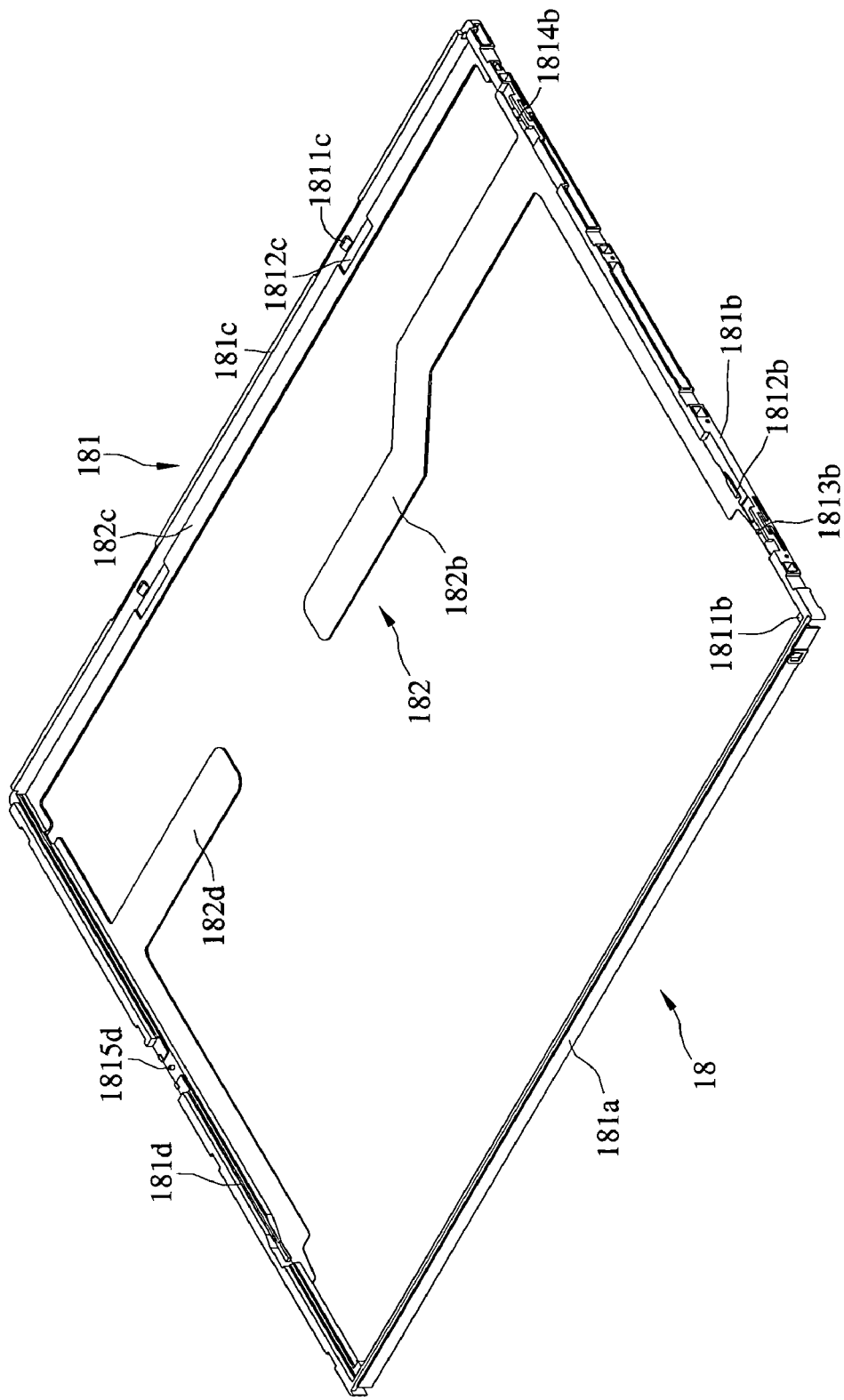
FIG. 2 is a perspective view of the invention.

Referring to FIG. 2, the assembling frame 18 includes a frame edge 181, which has at least four sides, and support blades 182 extending inwards from the bottom of the frame edge 181. The frame edge 181 has a selected height to accommodate the reflector 13, light guide panel 14 and optical films 15, 16 and 17 in the assembling frame 18. As shown in the drawing, the frame edge 181 is defined by including 181a, 181b, 181c and 181d, and support blades 182b, 182c and 182d to facilitate description of the structural and assembling relationship (as discussed in the following). The metal lampshade 12 is formed in a U-shape, is transversely fixed on the frame edge 181a, and houses the light source 11. It has a bottom side larger than its top side so that the bottom side of the metal lampshade 12 may serve as the support position for the bottom of the frame edge 181a to couple with the support blades 182b, 192c and 182d to hold the reflector 13, light guide panel 14 and optical films 15, 16 and 17.

Figure 4:
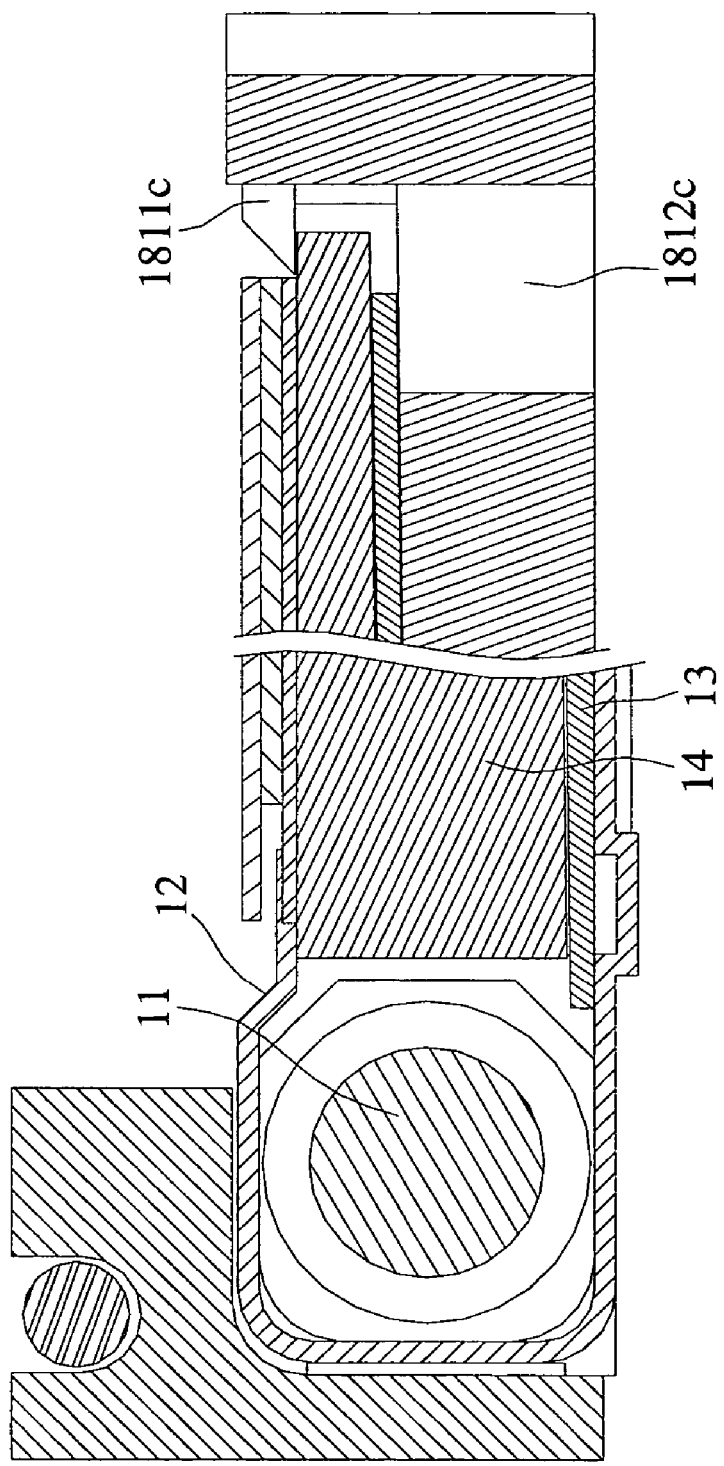
FIG. 4 is a schematic view of the invention showing the assembling frame coupled with the light guide panel.

The thicker side of the light guide panel 14 is completely wedged in the metal lampshade 12 to allow light generated by the light source 11 to completely enter in the light guide panel 14. However, the thicker side of the light guide panel 14 must maintain a gap with the light source 11 (as shown in FIG. 4) to correctly channel the light into the light guide panel 14. Therefore, the thicker side of the light guide panel 14 has a retaining trough 141 formed on the front edge of two sides thereof. Behind the retaining trough 141, there is a retaining member 142 (referring to FIG. 1). There are also a retaining member 1811b and a retaining trough 1812b located on the positions corresponding to the frame edges 181b and 181d (the frame edge 181d being corresponded as well). When the thicker side of the light guide panel 14 is wedged in the metal lampshade 12, the retaining trough 141 and retaining member 142 are coupled with the retaining member 1811b and retaining trough 1812b so that a desired gap is maintained between the thicker side of the light guide panel 14 and the light source 11 to prevent the light guide panel 14 from moving towards and hitting the light source 11.

The frame edges 181b and 181d further have anchor stubs 1813b, 1814b and 1815d corresponding to anchor holes 171, 172 and 173 formed on the lateral sides of the optical films 15, 16 and 17 (referring to FIG. 1, the same is applied to the optical films 15 and 16). Thereby the anchor holes 171, 172 and 173 of the optical films 15, 16 and 17 may be coupled on the anchor stubs 1813b, 1814b and 1815d to enable the optical films 15, 16 and 17 to be fixedly mounted onto the assembly frame 18.

Figure 3:
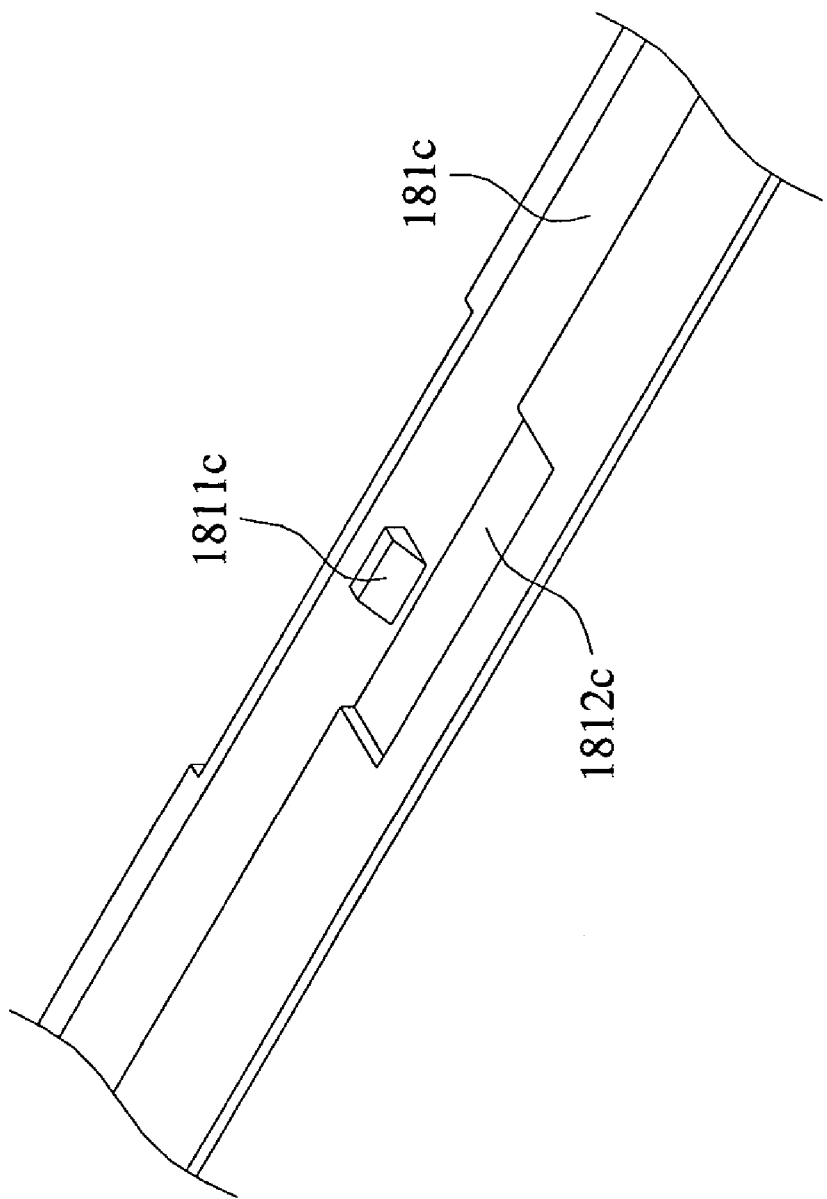
FIG. 3 is a schematic view of a latch blade of the invention.

As the light guide panel 14 is slightly smaller than the assembly frame 18, and is held in the frame edge 181, the light guide panel 14 is harnessed by the frame edge 181 without moving in the X-axis and Y-axis directions. Moreover, the thicker side of the light guide panel 14 is wedged in the metal lampshade 12, thus the thicker side of the light guide panel 14 is harnessed in the direction of the Z-axis. The frame edge 181c has a suspended latch blade 1811c (as shown in FIG. 3). A carved area 1812c is formed below the latch blade 1811c. Thus the latch blade 1811c has a desired flexibility in the horizontal direction to restrict the movement of the thinner side of the light guide panel 14 in the direction of the Z-axis. Therefore, the light guide panel 14 may be anchored in the assembling frame 18.

Referring to FIG. 4, the reflector 13 and the light guide panel 14 are mounted on the assembling frame 18 and are confined by the frame edge 181 from moving in the X-axis and Y-axis directions. The thicker side of the light guide panel 14 is wedged in the metal lampshade 12, and the thinner side of the light guide panel 14 is latched under the latch blade 1811c so that the light guide panel 14 is confined by the metal lampshade 12 and the latch blade 1811c from moving in the direction of the Z-axis, and is thereby anchored on the assembling frame 14. In order to absorb the deformation of the light guide panel 14 caused by environmental factors, a gap d is formed between the light guide panel 14 and the frame edge 181c so that even in high temperature or humidity environments that cause the light guide panel 14 to be deformed and squeezed in the direction of the Z-axis and become warped, the flexibility of the latch blade 1811c in the horizontal direction can keep the gap d to a minimum. Hence even if the light guide panel 14 becomes deformed, the latch blade 1811c is squeezed by the light guide panel 14 and extends slightly outwards to make the light guide panel 14 not warp in the direction of the Z-axis. In addition, with the latch blade latching the light guide panel 14, the gap d may be created with a minimum value to reduce the moving distance of the light guide panel 14 in the direction of the Y-axis so that the thicker side of the light guide panel 14 can be prevented from separating from the metal lampshade 12 to maintain a good light transmission relationship.

Figure 5:
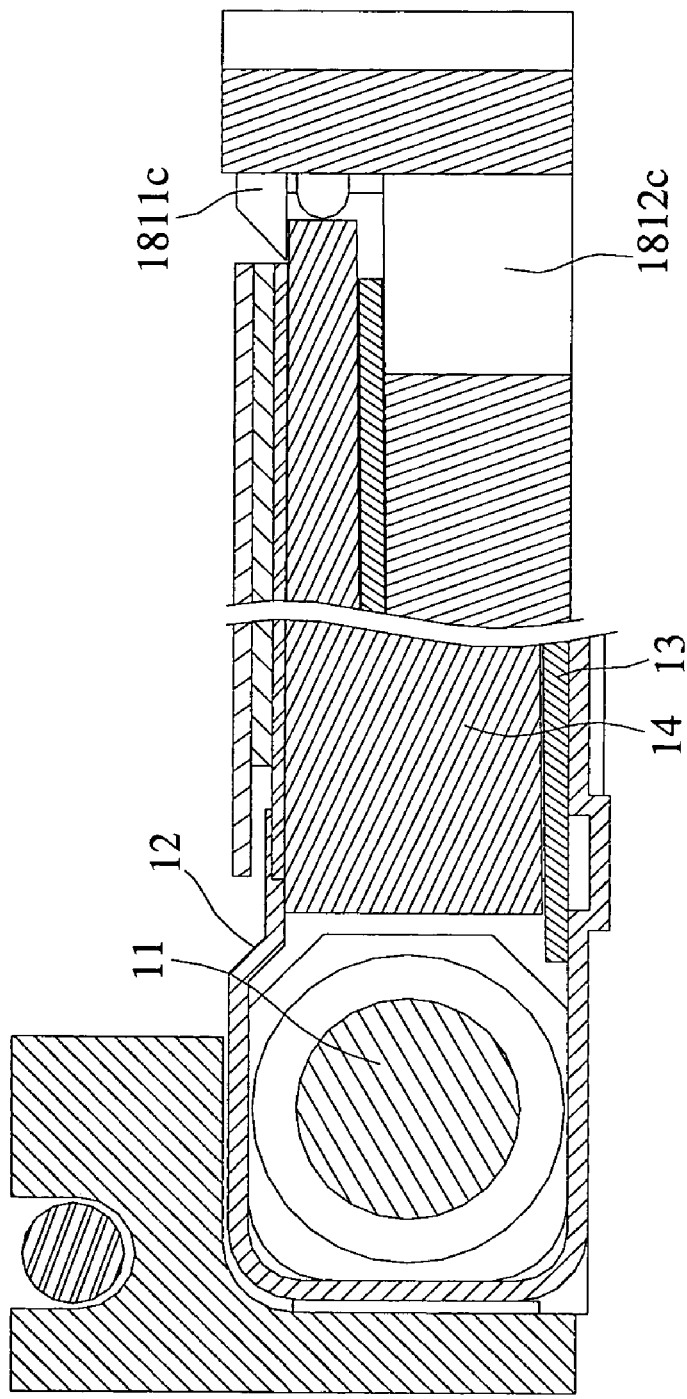
FIG. 5 is a schematic view of another embodiment of the latch blade of the invention.

Referring to FIG. 5, the latch blade 1811c may also have a bucking block 1813c extending inwards to press the thinner side of the light guide panel 14 to eliminate the gap and further ensure that the thicker side of the light guide panel 14 maintains a secured anchoring relationship with the metal lampshade 12.

Figure 6A:
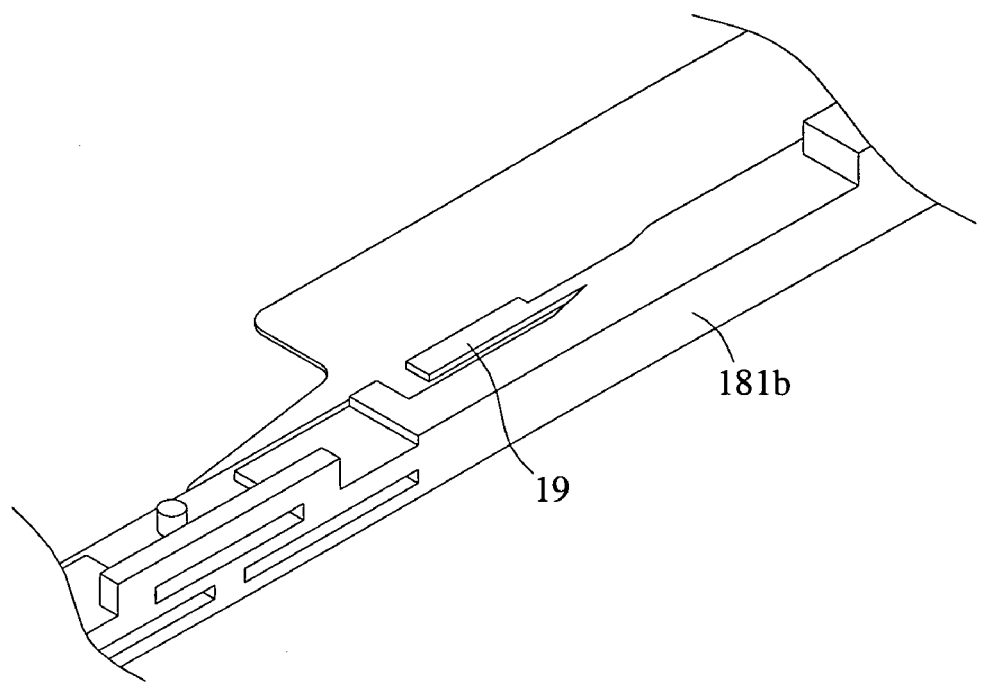
FIGS. 6A and 6B are schematic views of the flap of the invention.
Figure 6B:
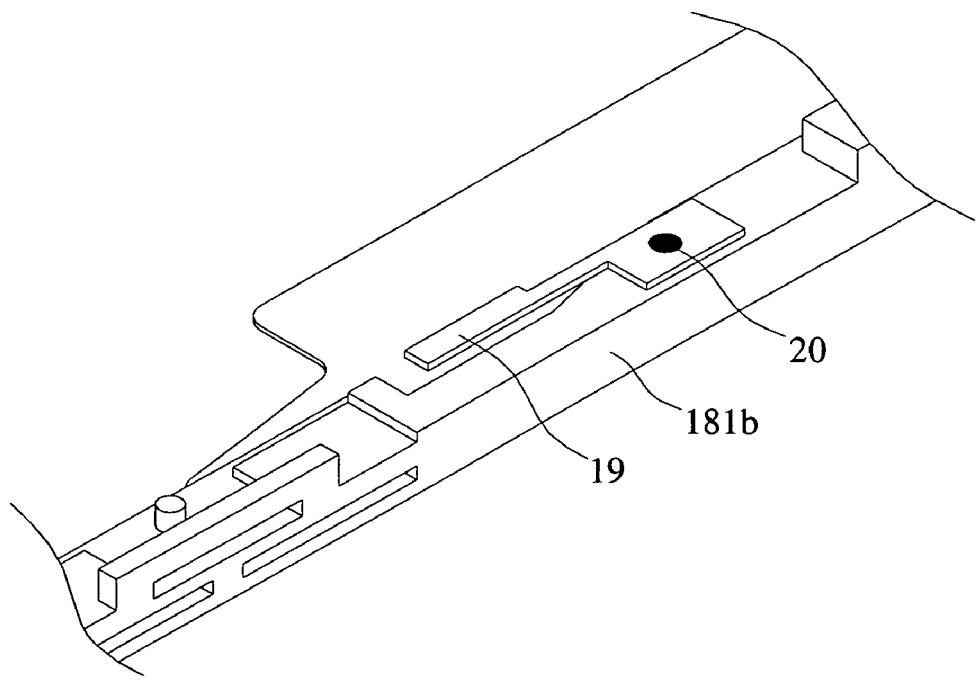

In addition, as the thicker side of the light guide panel 14 must be anchored in the metal lampshade 12, in the event that the light guide panel 14 escapes from the metal lampshade 12, light emitted from the light source 11 generates a bright light and affects the display quality. To remedy this problem, refer to FIG. 6A for a design to secure the anchor relationship of the thicker side of the light guide panel 14 and the metal lampshade 12. A suspending flap 19 is directly formed above the retaining trough 1812b to latch the retaining member 142 of the light guide panel 14 to further prevent the light guide panel 14 from moving in the direction of the Z-axis. Therefore the thick side of the light guide panel 14 and the metal lampshade 12 may maintain a secured anchor relationship. Referring to FIG. 6B, the flap 19 may also be bonded to the frame edge 181b by a binding member 20.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. An assembling frame for back light modules for assembling and anchoring a reflector, a light guide panel, a plurality of optical films and a lampshade, the lampshade being located on one side of the assembling frame, and the reflector, the light guide panel, and the optical films being mounted onto the assembling frame in this order, the assembling frame comprising at least:
    a frame edge having a selected height to hold the reflector, the light guide panel, and the optical films;
    a plurality of support blades extended inwards from the bottom of the frame edge to hold the reflector, the light guide panel, and the optical films; and
    a plurality of latch blades located on the frame edge on other side opposing the lampshade and extended horizontally being flexible to latch the top side of the light guide panel, the latch blades being suspended on the frame edge and above a carved space to have flexibility.

2. The assembling frame for back light modules of claim 1, wherein the latch blades are extended inwards from the frame edge to form a bucking block to press a lateral side of the light guide panel.

3. A assembling frame for back light modules for assembling and anchoring a reflector, a light guide panel, a plurality of optical films and a lampshade, the lampshade being located on one side of the assembling frame, and the reflector, the light guide panel, and the optical films being mounted onto the assembling frame in this order, the assembling frame comprising at least:
    a frame edge having a selected height to hold the reflector, the light guide panel, and the optical films;
    a plurality of support blades extended from the bottom of the frame edge to hold the reflector, the light guide panel, and the optical films;
    a plurality of latch blades located on the frame edge on other side opposing the lampshade and extended horizontally being flexible to latch the top side of the light guide panel; and
    a plurality of flaps suspended on the frame edge abutting the top surface of two sides of the lampshade to latch the top side of the light guide panel to confine the light guide panel.

4. The assembling frame for back light modules of claim 3, wherein the latch blades are suspended on the frame edge and above a carved space, and have flexibility.

5. The assembling frame for back light modules of claim 3, wherein the latch blades are extended inwards from the frame edge to form a bucking block to press a lateral side of the light guide panel.

6. The assembling frame for back light modules of claim 3, wherein the frame edge has a plurality of latch troughs, the light guide panel having latch members corresponding to the latch troughs, the flaps being located on the latch troughs.

7. The assembling frame for back light modules of claim 3, wherein the flaps are integrally formed on the frame edge.

8. The assembling frame for back light modules of claim 3, wherein the flaps are bonded to the frame edge by means of a binding member.

* * * * *